United States Patent
Bradshaw et al.

(10) Patent No.: US 8,839,901 B1
(45) Date of Patent: Sep. 23, 2014

(54) TRANSFER CASE SKID SHIELD

(71) Applicant: International Truck Intellectual Property Company, LLC, Lisle, IL (US)

(72) Inventors: Matthew Bradshaw, Palatine, IL (US); William C. Sump, Jr., Deerfield, IL (US); Robert A. Weber, Elburn, IL (US); Craig Birkett, Naperville, IL (US); Ling (Alex) Qun He, Naperville, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 57 days.

(21) Appl. No.: 13/847,532

(22) Filed: Mar. 20, 2013

(51) Int. Cl.
*B60K 17/00* (2006.01)
*B62D 25/20* (2006.01)

(52) U.S. Cl.
CPC .................................. *B62D 25/2072* (2013.01)
USPC ........................................................ 180/346

(58) Field of Classification Search
USPC ............. 296/203.01, 204, 205; 280/770, 781, 280/785, 796; 180/69.1, 311, 346
See application file for complete search history.

(56) References Cited

U.S. PATENT DOCUMENTS

| | | | |
|---|---|---|---|
| 1,182,378 A | | 5/1916 | Jewell |
| 3,779,330 A | | 12/1973 | Longpre |
| 3,826,327 A | | 7/1974 | Stover |
| 4,655,307 A | | 4/1987 | Lamoureux |
| 5,992,926 A | * | 11/1999 | Christofaro et al. .......... 296/204 |
| 6,202,778 B1 | | 3/2001 | Mistry |
| 6,516,907 B2 | | 2/2003 | Robinson |
| 6,726,273 B2 | | 4/2004 | Kruschhausen |
| 7,055,895 B1 | | 6/2006 | King et al. |
| 7,156,421 B2 | * | 1/2007 | Fowler et al. ................. 280/781 |
| 7,281,597 B2 | | 10/2007 | Pellillo et al. |
| 7,624,835 B2 | * | 12/2009 | Bowers ......................... 180/346 |
| 7,997,182 B1 | * | 8/2011 | Cox ............................. 89/36.09 |
| 8,028,781 B2 | | 10/2011 | Fausch |
| 8,402,878 B2 | * | 3/2013 | Schreiner et al. ........... 89/36.08 |
| 2008/0277972 A1 | | 11/2008 | Bonofiglio, Jr. |

OTHER PUBLICATIONS

Kevin Blumer, LM7 1976 Jeep CJ7—4 Wheel Drive Magazine, available at http://www.fourwheeler.com/features/1206-4wd-1976-jeep-cj-7/ (Posted Mar. 21, 2012).*
Polaris RZR Skid Plate| UTV Guide, available at http://www.utvguide.net/rzr_skid_plate.htm ("Copyright © 2010 Crowley Offroad LLC.").*

* cited by examiner

*Primary Examiner* — Paul N Dickson
*Assistant Examiner* — Robert A Coker
(74) *Attorney, Agent, or Firm* — Jeffrey P. Calfa; Mark C. Bach

(57) ABSTRACT

A skid shield for attachment to vehicle side rails for protecting an underbody vehicle component, where the vehicle has a cross member mounted to the side rails with mounting hardware and receiving holes, includes a body and a skid plate. The body extends from the first side rail to the second side rail and around the underbody of the vehicle component. The body has at least one frame member. The at least one skid plate is attached to the frame member. The skid shield also includes first and second attachment brackets that attach the frame member to the side rails. The attachment brackets have receiving holes for receiving a fastener. The receiving holes are configured for alignment with the receiving holes in the side rails. The fastener fastens both the attachment bracket of the skid shield and the mounting hardware of the cross member to the side rails.

12 Claims, 4 Drawing Sheets

TRANSFER CASE SKID SHIELD

BACKGROUND

Embodiments described herein relate generally to protective shields, and more particularly, to a protective shield for a transfer case of a motor vehicle.

A vehicle powertrain includes an internal combustion engine and a transmission that drives road-engaging wheels through a drivetrain. The drivetrain includes a driveshaft and axles. The engine is coupled to the input of the transmission, sometimes through a clutch for a manual transmission, and the driveshaft couples the transmission output shaft to the axle. Transfer cases are part of the powertrain that connects the transmission to the axles with drive shafts. The transfer case receives power from the transmission, and the power is delivered from the transfer case to the axles.

Located on the underbody of the vehicle, the transfer case may be vulnerable to impact with the ground or other obstructions as the vehicle traverses terrain. When the transfer case is impacted, there may be a loss of torque to the drive shafts, and there may be heavy damage to the powertrain.

Plates, bottom guards and shields are known to be located between side rails or other structural support members on the underside of the vehicle. The plates, guards and shields protect the body and the lower components of the vehicles from rocks and other debris which may be present on the roadway, or when the vehicle "bottoms out" on an uneven driving surface. In many instances, when contact with rocks, debris or other obstructions occurs, the plate, bottom guard and/or shield is damaged and is replaced with a new plate, bottom guard and/or shield.

SUMMARY

A skid shield for attachment to vehicle side rails for protecting an underbody vehicle component, where the vehicle has a cross member mounted to the side rails with mounting hardware and receiving holes, includes a body and a skid plate. The body of the skid shield extends from the first side rail to the second side rail and around the underbody of the vehicle component. The body has at least one frame member. The least one skid plate of the skid shield is attached to the frame member. The skid shield also includes first and second attachment brackets that attach the frame member to the side rails of the vehicle. The attachment brackets have receiving holes for receiving a fastener. The receiving holes are configured for alignment with the receiving holes in the side rails that receive the mounting hardware for the vehicle cross member. The fastener fastens both the attachment bracket of the skid shield and the mounting hardware of the cross member to the side rails.

A skid shield for attachment to a first and second side rail of a vehicle for protecting a transfer case located on the underbody side of the vehicle, where the vehicle has transfer case mounting supports mounted to the first and second side rails with mounting hardware, fasteners and receiving holes through the side rails, includes a body and at least one skid plate. The body of the skid shield extends from the first side rail to the second side rail and around the underbody side of the transfer case. The body has at least one frame member. The at least one skid plate of the skid shield is attached to the frame member. A first and second attachment bracket attach the frame member to the first and second side rail, the attachment brackets having receiving holes for receiving the fasteners that attach the mounting hardware for the transfer case mounting supports. The receiving holes of the attachment brackets are configured for alignment with the receiving holes in the side rails, where the fastener fastens both the attachment brackets of the skid shield and the mounting hardware of the transfer case mounting supports to the first and second side rails.

A skid shield for attaching to a first and second side rail of a vehicle for protecting a component located on the underbody side of the vehicle, includes a body, a plurality of attachment brackets and at least one skid plate. The body has a plurality of generally "C"-shaped, parallel-spaced, frame members extending from the first side rail to the second side rail and around a vehicle component. At least one of the frame members has a first side and a second side generally opposite of the first side, and a bottom side extending generally transversely between the first side and the second side. The plurality of attachment brackets are configured for attaching the plurality of frame members to the first side rail and the second side rail. At least one skid plate is attached to the bottom side of the at least one frame member, where the skid plate is generally transverse to the first side and the second side of the frame member.

DETAILED DESCRIPTION

Figure 1:
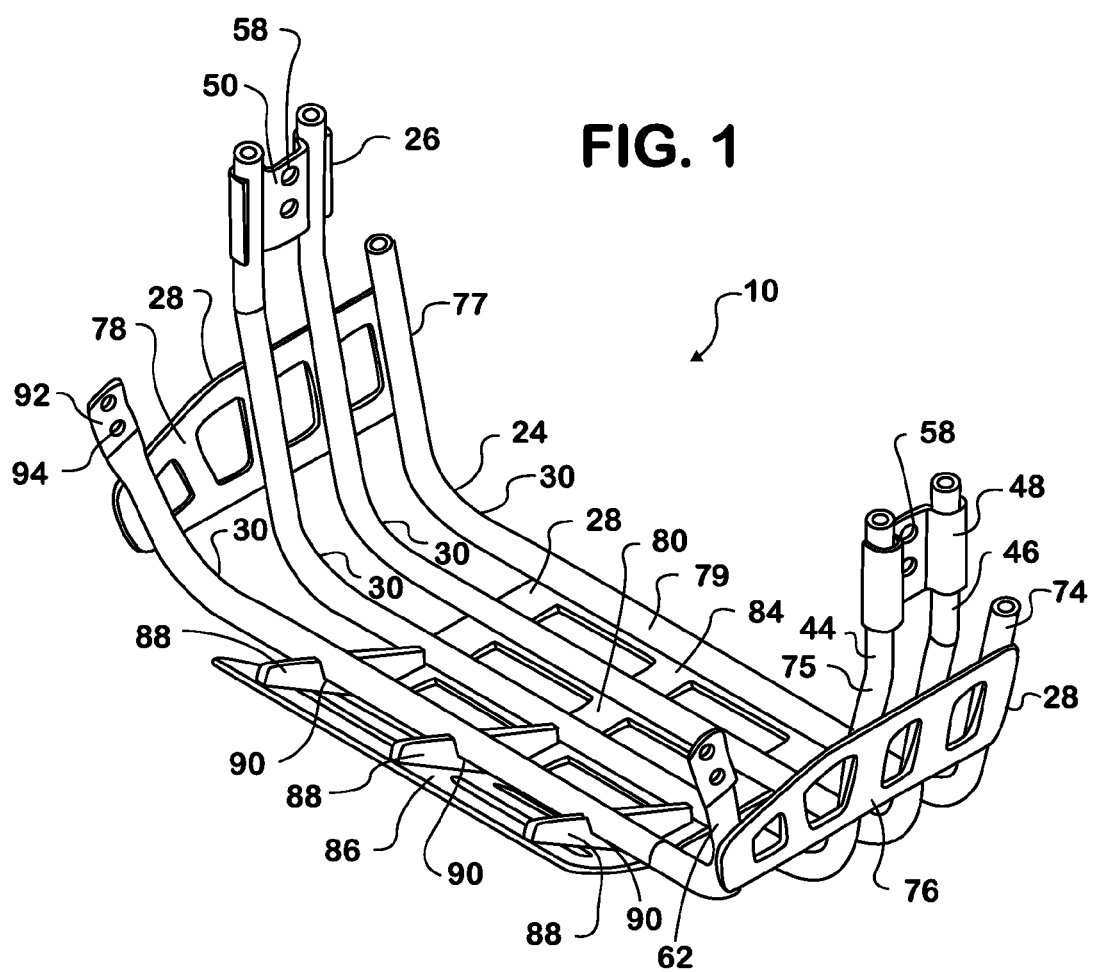
FIG. 1 is a top and side perspective view of a skid shield.
Figure 2:
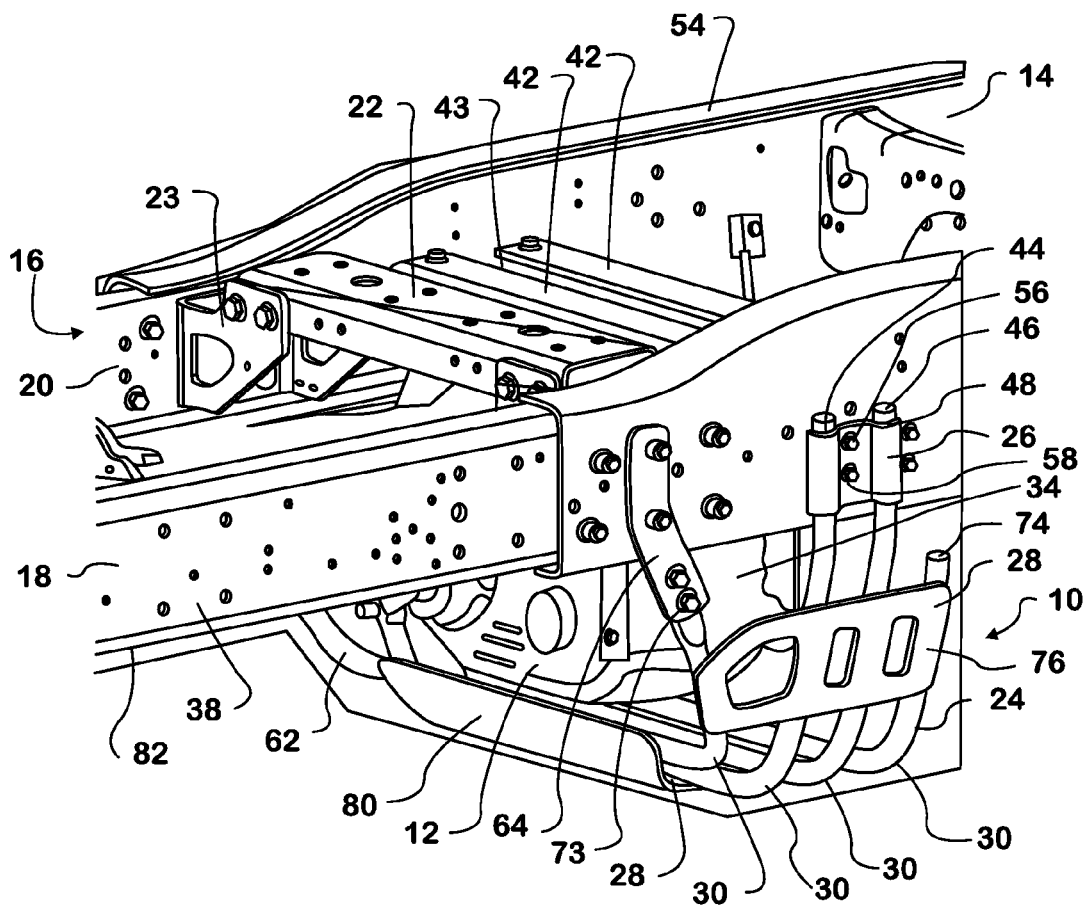
FIG. 2 is a top and side perspective view of the skid shield for a transfer case attached to a frame of a vehicle.

Referring to FIGS. 1-4, a skid shield for protecting a transfer case 12 is attached to a frame 14 of a vehicle 16 and is indicated generally at 10. The frame 14 includes a pair of longitudinally extending side rails 18, 20 which are generally parallel to each other and span a portion of the length of a vehicle 16. The side rails 18, 20 may be joined together by one or more cross members, and may include a cab cross member 22 located adjacent the transfer case 12. The cab cross member 22 spans from the inboard side of the side rail 18 to the inboard side of the side rail 20, and may be mounted to the side rails with mounting hardware 23. The skid shield 10 may be attached to the frame 14 at the connection of the cab cross member 22 or the mounting hardware 23 to the side rails 18, 20, or may be attached to the frame at other positions along the side rails 18, 20 that have existing mounting holes.

The skid shield 10 includes a body 24, attachment brackets 26, and at least one skid plate 28. The body 24 may have a framework construction formed of at least one frame member 30, however a shell configuration is also possible. The frame member 30 may be tubular in shape, however other structural frame members are possible. In the skid shield 10, there are multiple frame members 30 in a generally parallel arrangement that form a caged-enclosure around the transfer case 12 on at least the underbody side 32 of the transfer case, and the inboard sides 34, 36 of the transfer case. Additional sides around the transfer case 12 may also be partially or entirely enclosed by the body 24, such as the forward facing and rearward facing surfaces of the transfer case.

The skid shield 10 is attached to the side rail 18 at an exterior or outboard surface 38 of the side rail 18 and to the side rail 20 at an exterior or outboard surface 40 of the side rail 20. In the skid shield 10, a plurality of frame members 30 extend from the outboard surface 38 to the outboard surface 40, and are generally "C"-shaped to partially encircle the transfer case 12. The transfer case 12 may be attached to the frame 14 with mounting supports 42 that extend between the side rails 18, 20. The mounting supports may be attached to the frame rails with mounting hardware 43.

The body 24 of the skid shield 10 may include first and second frame members 44, 46 that are generally parallel and spaced from each other, and that attach to the side rails 18, 20 at receiving brackets 48, 50. At the side rails 18, 20, there may be side rail reinforcements 52, 54, in which case the frame members 44, 46 may be attached to the side rail reinforcements and to the side rails. The receiving brackets 48, 50 may receive the frame members 44, 46 within channels formed in the brackets, and the brackets may be fastened with fasteners 56 to the side rails 18, 20, however other configurations are possible. Receiving holes 58 in the receiving brackets 48, 50 are configured to be aligned with existing side rail holes 60 that are also used for attachment of the mounting hardware 43 of the transfer case mounting supports 42 to the side rails 18, 20 (see FIG. 4). The fasteners 56 for the receiving brackets 48, 50 are fed through side rail holes 60 and into the mounting hardware 43 for the mounting supports 42. In other words, by sharing the existing side rail holes 60, the fasteners 56 attach both the receiving brackets and the mounting supports 42 to the side rails 18, 20.

Figure 3:
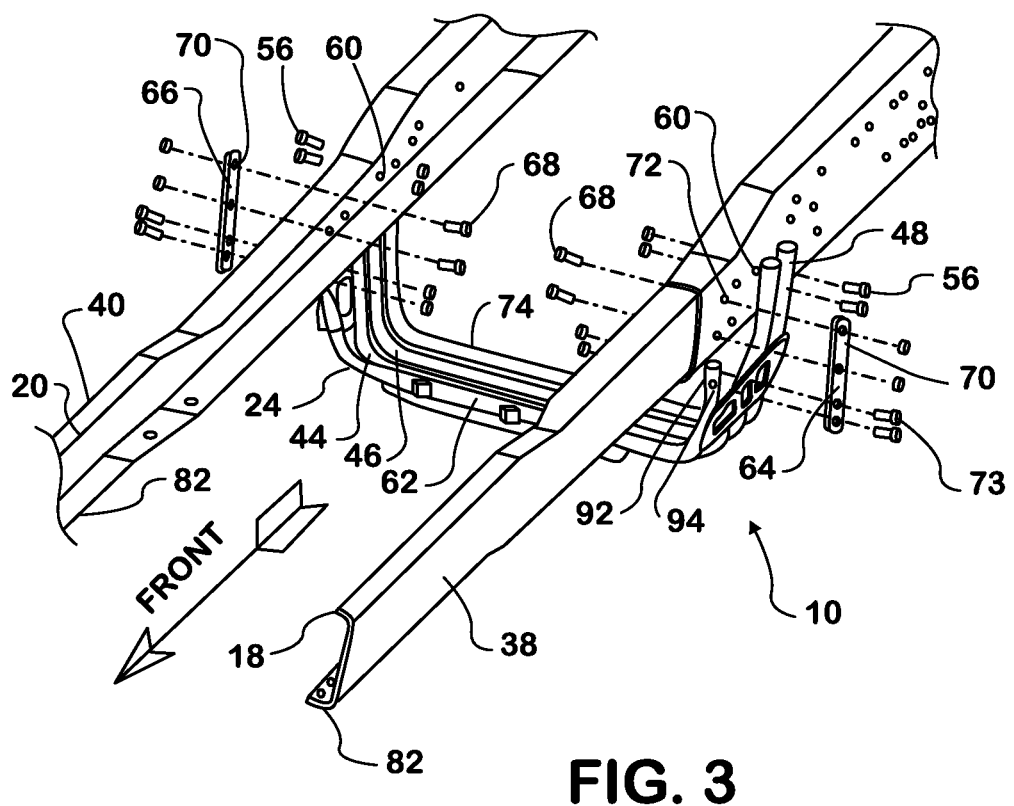
FIG. 3 is an exploded perspective view of the skid shield and the frame of the vehicle.
Figure 4:
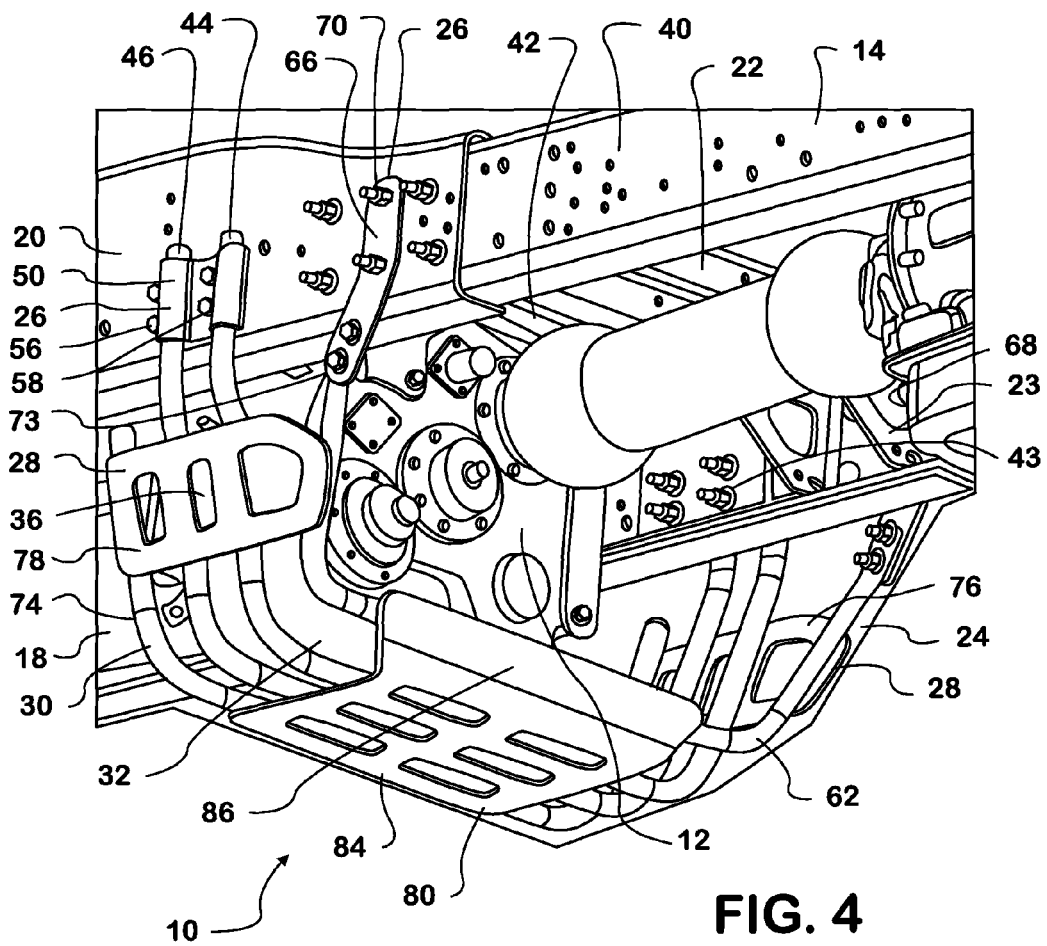
FIG. 4 a bottom perspective view of the skid shield for the transfer case attached to the frame of the vehicle.

As denoted in FIG. 3, the front of the vehicle 16 is in the direction indicated by the arrow. The body 24 may also include a third frame member 62 that is forward of the first and second frame members 44, 46, that may be attached to the side rails 18, 20 with mounting brackets 64, 66. The third frame member 62 may extend from the mounting bracket towards the first and second frame members 44, 46 in a non-parallel arrangement with the first and second frame members. The mounting brackets 64, 66 are attached to the side rails 18, 20 with fasteners 68 through holes 70 in the mounting bracket that are configured to be aligned with existing side rail holes 72 that are also used for attaching the cab cross member 22 to the side rails 18, 20 (see FIG. 4). The fasteners 68 for the mounting brackets 64, 66 are fed through the side rail holes 72 and into the mounting hardware 23 for the cab cross member 22. In other words, by sharing the existing side rail holes 72, the fasteners 68 attach both the mounting brackets 64, 66 and the cab cross member 22 to the side rails 18, 20.

The mounting brackets 64, 66 may have a non-linear or angled shape to permit the third frame member 62 to extend at an angle with respect to the first and second frame members 44, 46. Attachment of the third frame member 62 to the mounting brackets 64, 66 may be with fasteners 73.

A fourth frame member 74 may be located rearward of and generally parallel to the first and second frame members 44, 46 in a spaced arrangement. Also having a general "C"-shape, the fourth member 74 may not extend up to the side rail 18, 20, such as for example where there are packaging constraints of the vehicle 16. Alternately, where there are no packaging constraints, the fourth member 74 may extend up to and attach to the side rails 18, 20.

The configuration of the frame members 44, 46, 62, 74 allow the attachment of the body 24 with the attachment brackets 26 at locations on the side rails 18, 20 where there are existing holes 58, 70 for attachment of the cab cross member 22 and for attachment of the mounting supports 42 for the transfer case 22. It is possible that the configuration of the skid shield 10 allows attachment of the body 24 with the attachment brackets 26 at other locations on the side rails 18, 20 where there are existing holes for mounting other components.

With the frame-members 44, 46, 62, 74 each having a generally "C"-shape, the frame members may each have a first side 75, a second side 77 that is generally opposite the first side, and a bottom side 79 that extends between the first side and the second side. The bottom side 79 may be generally transverse to the first side 75 and the second side 77.

The skid plates 28 include a first side skid plate 76 and a second side skid plate 78 that are attached to the body 24. The skid plates 28 may be attached to body 24 such that the skid plates are generally parallel with the outboard surfaces 38, 40 of the side rails 18, 20. The first side skid plate 76 may be attached to the frame members 30 at their first side 75, and the second side skid plate 78 may be attached to the frame members 30 at their second side 77. The first, second, third and fourth frame members 44, 46, 62, 74 may all be attached to the first side skid plate 76 and the second side skid plate 78. A bottom skid plate 80 may be attached to the first, second, third and fourth frame members 44, 46, 62, 74 at their bottom side 79 such that the skid plate 80 is generally parallel with a bottom surface 82 of the side rails 18, 20.

Generally planar in configuration, the skid plates 28 may be laser-cut and welded to the frame members 30. In the skid shield 10 having tubular frame members 30, the frame members may be mitered and pressed flat in the localized areas of attachment to the skid plates 28. The skid plates 28 may have openings between the areas of attachment to the frame members 30 to reduce weight.

The bottom skid plate 80 may have a generally planar sled portion 84 that is attached to the bottom side 79 of the frame members 30, and a bow portion 86 that extends from the sled portion at an angle. The sled portion 84 may lay in a plane that is generally parallel with the underbody of the vehicle 16. In the skid shield 10, the bow portion 86 has an angle of about 30-degrees from the plane formed by the sled portion 84. Ribs 88 may be formed with the bottom skid plate 80 or added on to the skid plate at the upwardly facing side to provide additional strength. A cradle 90 may be formed in each rib 88 to receive the third frame member 62. The third frame member 62 may be welded to the ribs 88, which are in turn welded to the bow portion 86, however other attachment configurations are possible.

In use, the skid shield 10 may impede the impact of the transfer case 12 with rocks and other debris. When the vehicle 16 traverses the rock or other debris while the vehicle is travelling in the forward direction, the angled bow portion 86 of the bottom skid plate 80 will traverse the object first. With the angled transition from the bow portion 86 to the sled portion 84, the skid plate 80 may slide up the impeding object, absorbing energy during the impact.

Each end 92 of the third frame member 62 may be flattened or otherwise shaped to be received by the mounting bracket 64. Member holes 94 may be disposed through the ends 92 for the receiving fasteners 73 for attachment of the third frame member to the mounting bracket 64. Alternately, instead of separate components, the skid shield 10 may be manufactured with the attachment brackets 26 or other attachment mechanisms integrally formed with the frame members 30. Additionally, the skid shield 10 may be manufactured with the skid plates 28 integrally formed with the frame members 30. In a further alternate embodiment, the frame members 30 may be attached to the side rails 18, 20 at the inboard surface of the side rails.

The skid shield 10 may have sufficient strength to withstand impacts with objects. Example strength numbers may be quantified as follows: The skid shield 10 may be strong enough to protect the driveline and transfer case 12 under a load of 8,600 lbs hitting the bottom skid plate 80. If the obstacle impacted is less than 10.8" high from the ground, the skid shield 10 may be strong enough to traverse over the obstacle without contacting the driveline and transfer case 12. The skid shield 10 may not undergo material yielding at a vertical loading under 1000 lbs. Under a load vertical to the bottom skid plate 80 from the front side position, the front skid plate 10 may contact the driveline at 13,000 lbs. Under a load vertical to the bottom skid plate 80 from the rear center position, the front skid plate 10 may contact the driveline at 14,000 lbs. Under a load normal to the bow portion 86 of the bottom skid plate 80, the skid shield 10 may contact the driveline at 8,640 lbs. At a 8,640 lb load normal to the skid shield 10, the vehicle 16 may lift upwards 55 mm at the bottom skid plate 80 surface. An obstacle less than 10.8" high from the ground may be able to pass under the skid shield 10 without damaging the driveline or transfer case 12. These strength numbers should not be interpreted in any way as limiting to the skid shield 10.

The body 24, the attachment brackets 26 and the skid plates 28 may all be formed of a strong plastically deformable metal, such as 50 ksi steel, however other metals are contemplated. The skid shield 10 may also be formed of any other strong materials. Additionally, the skid shield 10 may be formed of a heat resistant material since it may be located near components of the exhaust system.

With the skid shield 10, when the vehicle 16 traverses a rock or other debris, the angled bow portion 86 of the bottom skid plate 80 will traverse the object first. With the angled transition from the bow portion 86 to the sled portion 84, the skid plate 80 slides up the impeding object, absorbing energy during the impact. Due to the strength of the skid shield 10 and the ability to absorb energy, the skid shield may also withstand the impact for further use of the skid shield on the vehicle 16.

While the skid shield 10 was explained with reference to use on a heavy duty vehicle 16, it should be appreciated that the skid shield may also be used in light duty automotive vehicles. Further, while the skid shield 10 was explained with reference to use in protecting the transfer case 12, it should be appreciated that the skid shield can be used to protect other components that protrude from the underbody of the vehicle.

What is claimed is:

1. A skid shield for attachment to a first side rail and a second side rail of a vehicle for protecting a component located on an underbody side of the vehicle, the vehicle having a cab cross member mounted to the first side rail and the second side rails with mounting hardware and receiving holes through the first side rail and the second side rails, the skid shield comprising:
    a body that extends from the first side rail to the second side rail and around the underbody side of the component, the body having at least one frame member;
    at least one skid plate attached to the at least one frame member; and
    a first attachment bracket and second attachment bracket that attach the at least one frame member to the first side rail and the second side rail, the first attachment bracket and the second attachment bracket having receiving holes for receiving a fastener, the receiving holes of the first attachment bracket and the second attachment bracket are configured for alignment with the receiving holes in the first side rail and the second side rail, wherein the fastener fastens both the first attachment bracket and the second attachment bracket of the skid shield and the mounting hardware of the cab cross member to the first side rail and the second side rail.

2. The skid shield of claim 1 wherein the body further comprises multiple generally "C"-shaped tubular frame members that extend from the first side rail to the second side rail.

3. The skid shield of claim 1 further comprising a second frame member, the at least one frame member and the second frame member being generally parallel and spaced from each other, and a third frame member that is attached to the first side rail and the second side rail with the first attachment bracket and the second attachment bracket, the third frame member extends from at least one of the first attachment bracket and the second attachment bracket towards the at least one frame member and the second frame member in a non-parallel arrangement with the at least one frame member and the second frame member.

4. The skid shield of claim 3 further comprising a first receiving bracket and a second receiving bracket for attaching the at least one frame member and the second frame member to the first side rail and the second side rail.

5. The skid shield of claim 3 further comprising a second skid plate and a third skid plate, wherein all of the at least one skid plate, the second skid plate and the third skid plate are attached to all of the at least one frame member, the second frame member and the third frame member.

6. The skid shield of claim 1 wherein the at least one skid plate has a sled portion and a bow portion extending from the sled portion at an angle.

7. A skid shield for attachment to a first side rail and a second side rail of a vehicle for protecting a transfer case located on an underbody side of the vehicle, the vehicle having transfer case mounting supports mounted to the first side rail and the second side rail with mounting hardware, fasteners and receiving holes through the first side rail and the second side rail, the skid shield comprising:
    a body that extends from the first side rail to the second side rail and around the underbody side of the transfer case, the body having at least one frame member;
    at least one skid plate attached to the at least one frame member;
    a first attachment bracket and a second attachment bracket that attach the at least one frame member to the first side rail and the second side rail, the first attachment bracket and the second attachment bracket having receiving holes for receiving the fasteners, the receiving holes of the first attachment bracket and the second attachment bracket are configured for alignment with the receiving holes in the first side rail and the second side rail, wherein the fasteners fasten both the first attachment bracket and the second attachment bracket and the mounting hardware of the transfer case to the first side rail and the second side rail.

8. The skid shield of claim 7 wherein the body further comprises multiple generally "C"-shaped tubular frame members that extend from the first side rail to the second side rail.

9. The skid shield of claim 7 further comprising a second frame member, the at least one frame member and the second frame member being generally parallel and spaced from each other and are attached to the first side rail and the second side rail with the first attachment bracket and the second attachment bracket, and a third frame member that extends from a first mounting bracket and the second mounting bracket towards the at least one frame member and the second frame member in a non-parallel arrangement with respect to the at least one frame member and the second frame member.

10. The skid shield of claim 9 further comprising a second skid plate and a third skid plate, wherein all of the at least one skid plate, the second skid plate and the third skid plate are attached to all of the at least one frame member, the second frame member and the third frame member.

11. The skid shield of claim 7 wherein the at least one skid plate has a sled portion and a bow portion extending from the sled portion at an angle.

12. A skid shield for attaching to a first and second side rail of a vehicle for protecting a component located on the underbody side of the vehicle, the skid shield comprising:
- a body having a plurality of generally "C"-shaped, parallel-spaced, frame members extending from the first side rail to the second side rail and around a vehicle component, at least one of the frame members having a first side and a second side generally opposite of the first side, and a bottom side extending generally transversely between the first side and the second side;
- a plurality of attachment brackets configured for attaching the plurality of frame members to the first side rail and the second side rail;
- at least one skid plate attached to the bottom side of the at least one frame member, wherein the skid plate is generally transverse to the first side and the second side of the frame member, wherein the plurality of generally "C"-shaped frame members further includes at least one non-parallel frame member, wherein the non-parallel frame member is attached to the at least one skid plate.

\* \* \* \* \*